United States Patent
Tsurumaki et al.

(10) Patent No.: US 8,968,504 B2
(45) Date of Patent: Mar. 3, 2015

(54) METHOD FOR MANUFACTURING LAMINATED FILM AND LAMINATED FILM

(71) Applicant: Shinmarutokushushigyo Co., Ltd., Konan-shi, Aichi-ken (JP)

(72) Inventors: Takahiko Tsurumaki, Gosen (JP); Syusaku Sasano, Nagoya (JP)

(73) Assignee: Shinmarutokushushigyo Co., Ltd., Konan-shi, Aichi-ken (JP)

( * ) Notice: Subject to any disclaimer, the term of this patent is extended or adjusted under 35 U.S.C. 154(b) by 0 days.

(21) Appl. No.: 13/770,503

(22) Filed: Feb. 19, 2013

(65) Prior Publication Data

US 2014/0220307 A1  Aug. 7, 2014

(30) Foreign Application Priority Data

Feb. 5, 2013  (JP) ................. 2013-020533

(51) Int. Cl.
| | |
|---|---|
| B29C 65/02 | (2006.01) |
| B32B 37/16 | (2006.01) |
| B32B 43/00 | (2006.01) |
| B32B 38/00 | (2006.01) |
| B32B 3/28 | (2006.01) |

(52) U.S. Cl.
CPC ............... B32B 38/0012 (2013.01); B32B 3/28 (2013.01)

USPC ............ 156/229; 156/308.2; 156/309.9

(58) Field of Classification Search
USPC .............. 156/229, 272.2, 273.5, 308.2, 309.9
See application file for complete search history.

(56) References Cited

U.S. PATENT DOCUMENTS

| | | | | |
|---|---|---|---|---|
| 4,188,443 | A * | 2/1980 | Mueller et al. ................ | 428/216 |
| 5,041,047 | A * | 8/1991 | Casale .......................... | 446/220 |
| 6,015,601 | A * | 1/2000 | Garcia ......................... | 428/35.8 |
| 2006/0030667 | A1 * | 2/2006 | Yalvac et al. ................. | 525/191 |

FOREIGN PATENT DOCUMENTS

| | | |
|---|---|---|
| JP | 7067789 B | 7/1995 |
| JP | 3110646 B2 | 11/2000 |
| JP | 3460725 B2 | 10/2003 |
| JP | 3531073 B2 | 5/2004 |
| JP | 4400101 B2 | 1/2010 |
| JP | 4449349 B2 | 4/2010 |
| JP | 4790159 B2 | 10/2011 |

* cited by examiner

*Primary Examiner* — Sing P Chan
(74) *Attorney, Agent, or Firm* — Koppel, Patrick, Heybl & Philpott

(57) ABSTRACT

A method for manufacturing a laminated film according to the present invention is a method for manufacturing a laminated film constituted by laminating a first film and a second film. The method includes a lamination step of pasting together the first film and the second film in a state where the first film is stretched to be longer than a natural length thereof in a predetermined direction.

6 Claims, 2 Drawing Sheets

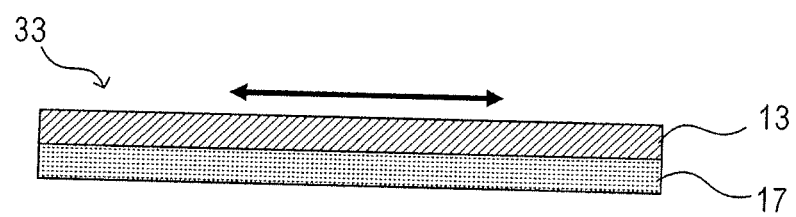
Fig.2-A
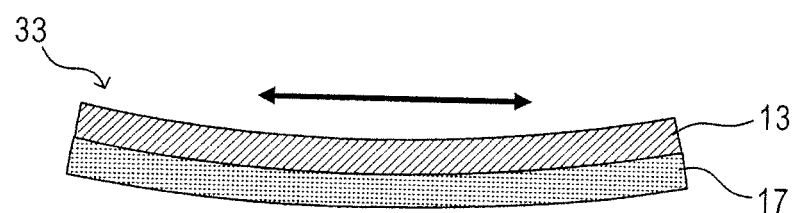
Fig.2-B

METHOD FOR MANUFACTURING LAMINATED FILM AND LAMINATED FILM

CROSS-REFERENCE TO RELATED APPLICATIONS

This application claims the benefit of Japanese Patent Application No. 2013-20533 filed Feb. 5, 2013 in the Japan Patent Office, the disclosure of which is incorporated herein by reference.

BACKGROUND

The present invention relates to a laminated film to be used for a lid member or the like of a plastic container.

A container for encapsulating liquid such as sugar syrup or the like is provided with a plastic case and a film-like lid member. For the lid member, there has been conventionally used a film having a laminated structure of aluminum and plastic.

As a result of use of aluminum for the lid member, when one end of the lid member affixed to the case is peeled off from the case in order to open the container, the lid member becomes curled and is maintained in a curled state. Accordingly, an opening caused by peeling off the lid member remains open, which facilitates pouring of sugar syrup or the like without completely peeling off the lid member from the case.

In recent years, it has been promoted to reduce a use amount of aluminum for containers for reasons of environmental problems and the like. However, without using aluminum for the lid member, it is likely that the lid member cannot be sufficiently maintained in the curled state and usability of the container will be deteriorated.

Then, there has been proposed use of a laminated film, which is provided with curling property by means of heating, for a lid member of a container (see Japanese Patent No. 4790159).

SUMMARY

The lid member described in Japanese Patent No. 4790159 involves a problem that since curling property is provided to the lid member by means of heat-sealing, conditions, such as a heating temperature and a heating time of heat-sealing, are restricted to ranges for providing an appropriate curling property, The present invention provides a method for manufacturing a novel laminated film capable of providing curling property without using aluminum, and provides a laminated film.

In a first aspect of the present invention, there is provided a method for manufacturing a laminated film constituted by laminating a first film and a second film. The method includes a lamination step of pasting together the first film and the second film in a state where the first film is stretched to be longer than a natural length thereof in a predetermined direction.

A laminated film manufactured according to such method will be curled with a side of the first film as an inner side since the first film shrinks after the first film and the second film are pasted together. Accordingly, it is possible to provide a film with curling property without using aluminum. When the aforementioned laminated film is used for a lid member of a container for encapsulating liquid or the like, an opened part of the lid member will be curled and therefore an opening can be kept unclosed.

The aforementioned laminated film may be constituted by laminating at least two films, that is, the first film and second film, and also may be constituted by three or more films.

The aforementioned laminated film is manufactured, when it is defined that A1 is a length of a predetermined segment on the first film and A2 is a length of a predetermined segment on the second film in the predetermined direction before the lamination step, B1 is a length of the predetermined segment on the first film and B2 is a length of the predetermined segment on the second film after the lamination step, B1/A1 is a value C1, and B2/A2 is a value C2, such that a value D obtained by dividing the value C1 by the value C2 is within a range of $D \leq 0.9994$. As a result, an excellent curling property is provided to the laminated film.

In the aforementioned laminated film, it is possible to use, as the first film, a film composed mostly of at least one of polypropylene resin and polyester resin. The polypropylene resin may be, for example, oriented polypropylene, monoaxially-oriented polypropylene, BOPP (biaxially-oriented polypropylene), and non-oriented polypropylene.

Also, in the aforementioned laminated film, it is possible to use, as the second film, a film composed mostly of at least one of polyester resin and polypropylene resin. The polyester resin may be, for example, polyethylene terephthalate.

In a case of using the aforementioned first film, it is possible to achieve a desired stretch rate with a relatively weak tension by heat-treating the first film. Specifically, the first film may be heated to 80° C. or higher and stretched when pasting together the first film and the second film in the lamination step.

In a second aspect of the present invention, there is provided a laminated film constituted by laminating a first film and a second film. The laminated film includes the first film and the second film to be laminated on the first film. The first film and the second film are pasted together in a state where the first film is stretched to be longer than a natural length thereof in a predetermined direction.

The laminated film constituted as above achieves the same operation and effects as the laminated film manufactured according to the method for manufacturing a laminated film in the first aspect of the present invention.

BRIEF DESCRIPTION OF THE DRAWINGS

The present invention will now be described by way of exemplary embodiments with reference to the accompanying drawings, in which:

FIG. 2A is a side cross-sectional view of the laminated film in a tensioned state immediately after lamination; and FIG. 2B is a side cross-sectional view of the laminated film in a state after a predetermined time has elapsed since the lamination.

DETAILED DESCRIPTION OF THE PREFERRED EMBODIMENTS

Figure 1:
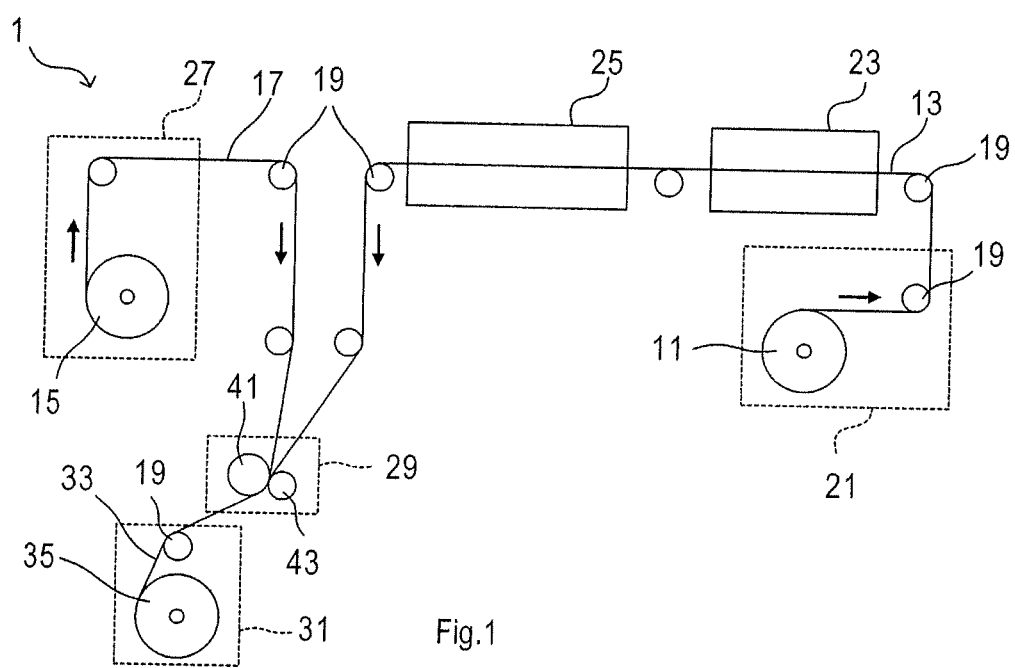
FIG. 1 is a schematic diagram of a pasting device for manufacturing a laminated film in the embodiments.

An explanation will be provided hereinafter of steps for manufacturing a laminated film by pasting two types of films together.

FIG. 1 schematically shows a pasting device 1 for manufacturing a laminated film in an embodiment. The pasting device 1 is designed to paste together a first film 13 drawn from a first delivery roll 11 and a second film 17 drawn from a second delivery roll 15.

The pasting device 1 includes a first delivery section 21, a coating section 23, a heating section 25, a second delivery section 27, a pasting section 29, and a winding section 31. The pasting device 1 also includes a plurality of guide rollers 19, some of which are not shown in the drawings. The first film 13 and the second film 17 are guided by the guide rollers 19.

The first film 13 wound around the first delivery roll 11 is delivered from the first delivery section 21 to the coating section 23. At the coating section 23, an adhesive is applied to one surface of the first film 13.

At the heating section 25, a solvent of the adhesive is evaporated to be removed by heating. Also, the first film 13 is heated to promote extension thereof. Subsequently, the first film 13 is conveyed to the pasting section 29.

The second film 17 wound around the second delivery roll 15 is delivered from the second delivery section 27 to the pasting section 29.

At the pasting section 29, the one surface of the first film 13, to which the adhesive has been applied, and the second film 17 are pressure bonded with pressure rollers 41 and 43, to thereby obtain a laminated film 33. At the winding section 31, the laminated film 33 is wound to form a winding roll 35.

Some of the guide rollers 19 are configured to have variable axis positions. By changing the axis positions and adjusting respective rotation speeds of the first delivery roll 11, the second delivery roll 15, and the winding roll 35, it is possible to adjust a tension in a delivery direction applied to each of the first film 13 and the second film 17 (hereinafter, simply referred to as a "tension"). The tension may be adjusted at each of the first delivery section 21, the coating section 23, the heating section 25, the second delivery section 27, the pasting section 29, and the winding section 31.

The pasting device 1 adjusts the tension applied to each of the first film 13 and the second film 17, and pastes together the first film 13 and the second film 17 at the pasting section 29 in a state where a stretch rate of the first film 13 in a longitudinal direction (a delivery direction) is relatively large. In other words, the first film 13 and the second film 17 are pasted together in a state where the first film 13 is stretched to be longer than a natural length thereof, while the second film 17 is stretched as little as possible.

FIGS. 2A-2B show side cross-sectional views of the laminated film 33 manufactured as described above. In these figures, each arrow direction indicates a longitudinal direction (a delivery direction). FIG. 2A shows a state when the first film 13 and the second film 17 have been pasted together at the pasting section 29. At this moment, the first film 13 is applied with a tension and is stretched to be longer than the natural length thereof in the longitudinal direction. As time goes along, the first film 13 shrinks to return to an initial length, and thereby the laminated film 33 is curled such that the first film 13 is located inside a resulting curl as shown in FIG. 2B.

The first film 13 may be formed of a material having a property that the material is extended when a tension is applied and returns to an initial length when no tension is applied. An example of such material is an olefin material. More specifically, a film composed mostly of polypropylene resin, particularly OPP (oriented polypropylene), monoaxially-oriented polypropylene, BOPP (biaxially-oriented polypropylene), or non-oriented polypropylene, may be employed for the first film 13. Alternatively, polyester resin may be employed.

The second film 17 may be formed of a material that can be extended little even when a tension is applied. An example of such material is a film composed mostly of PET (polyethylene terephthalate) resin or the like. Also, olefin resin, such as CPP (non-oriented polypropylene), may be employed.

These film materials may be coated with some other material. For example, an aluminum metallized VM film (VMOPP, VMCPP, VMPET) may be employed.

As the adhesive, commonly used adhesives containing, for example, an aromatic system or aliphatic system may be employed.

Embodiments and Comparative Examples

The first film and the second film used in Embodiments 1-3 are as follows:

The first film: BOPP#40, 1020 mm width, 1000 m (produced by Mitsui Chemicals Tohcello, Inc., OP-U1, 40 micron (μm))

The second film: PET#12, 1020 mm width, 1000 m (produced by UNITIKA LTD., Emblet PET, 12 micron (μm))

On each of these films, two marks were placed with a predetermined length therebetween before these films were set in the pasting device 1, that is, in a state where no tension was applied and no heating was performed (hereinafter, simply referred to as a "normal state"). Subsequently, these films were laminated while adjusting the tensions to be applied thereon, and then curling property and changes in the length between the aforementioned marks after the lamination were measured. "After the lamination" here means after elapse of 24 hours.

Experimental conditions and experimental results are shown in Table 1 below. In Table 1, "First Delivery Section", "Coating Section", "Heating Section", and "Second Delivery Section" in the column of "Tension" mean tensions at the first delivery section 21, the coating section 23, the heating section 25, and the second delivery section 27, respectively.

In the column of "Length between Marks", "First (Before)" means the length between the marks on the first film in the normal state, "First (After)" means the length between the marks on the first film after the lamination, "Second (Before)" means the length between the marks on the second film in the normal state, and "Second (After)" means the length between the marks on the second film after the lamination.

"First" and "Second" in the column of "Change Rate" mean a value of B1/A1 (a value C1, %) and a value of B2/A2 (a value C2, %), respectively, wherein A1 is a length between the marks on the first film and A2 is a length between the marks on the second film in the normal state (i.e., a length of a predetermined segment on each film in a predetermined direction before a lamination step in the present invention), B1 is a length between the marks on the first film and B2 is a length between the marks on the second film after the lamination (i.e., a length of the predetermined segment on the each film after the lamination step in the present invention), and "First/Second" means a value (a value D) obtained by dividing the value C1 of the first film by the value C2 of the second film. The Value D is a parameter which indicates a degree of coincidence between changes in length of the first film and the second film. If the value D is "1", degrees of change from the normal state are the same between the first film and the second film. If the value D is less than "1", it can be said that the first film has shrunk more than the second film. In one embodiment, the marks on the first film define a first predetermined segment. In one embodiment, the marks on the second film define a second predetermined segment.

In the column of "Evaluation", "Good" indicates a case where the laminated film cut into 10 cm square was curled into a cylindrical shape having a diameter of 30 mm or less, while "No Good" indicates a case where the laminated film was curled into a cylindrical shape having a diameter of larger than 30 mm or a case where the laminated film was not curled.

A heating temperature was always 80° C., and a nip pressure (a pressure for pressure-bonding at the pasting section 29) was always 13250 N.

In each of Comparative Examples 1 and 2, a laminated film was manufactured by using the same film material as in Embodiments 1 to 3, and applying lower tensions than in Embodiments 1 to 3, especially applying a lower tension at the heating section 25 where a significant effect is caused on extension of the film. Experimental results regarding Comparative Examples 1 and 2 are also indicated in Table 1.

TABLE 1

|  | Film | | Tension [N] | | | |
|---|---|---|---|---|---|---|
|  | First | Second | First Delivery Section | Coating Section | Heating | Second Delivery Section |
| Embodiment 1 | BOPP | PET | 80 | 80 | 80 | 80 |
| Embodiment 2 |  |  | 200 | 200 | 80 | 80 |
| Embodiment 3 |  |  | 60 | 70 | 80 | 80 |
| Comparative Example 1 |  |  | 60 | 70 | 45 | 80 |
| Comparative Example 2 |  |  | 60 | 70 | 45 | 160 |

|  | Length between Marks [mm] | | | | Change Rate | | | |
|---|---|---|---|---|---|---|---|---|
|  | First (Before) | First (After) | Second (Before) | Second (After) | First [%] | Second [%] | First/ Second | Evaluation |
| Embodiment 1 | 501.8 | 501 | 498.8 | 498.6 | 99.84 | 99.96 | 0.9988 | Good |
| Embodiment 2 | 501.8 | 501.4 | 498.5 | 498.4 | 99.92 | 99.98 | 0.9994 | Good |
| Embodiment 3 | 501.8 | 501.1 | 498.6 | 498.8 | 99.86 | 100.04 | 0.9982 | Good |
| Comparative Example 1 | 501 | 500.5 | 499 | 498.5 | 99.90 | 99.90 | 1.0000 | No Good |
| Comparative Example 2 | 500.5 | 500.2 | 499 | 498.5 | 99.94 | 99.90 | 1.0004 | No Good |

The first film was longer by about 1 mm than in the normal state immediately after the lamination, but shrank as time went along to become values indicated in Table 1.

As indicated in Table 1, all of the laminated films manufactured under respective conditions in Embodiments 1 to 3 as above had good curling property.

On the other hand, the laminated film in each of Comparative Examples 1 and 2 did not have a sufficient curling property. The laminated film having an excellent curling property was able to obtain the excellent curling property in a case where the change rate of "First/Second" (the value D) was 0.9994 or less (D≤0.9994). Although good results were observed at the value D within a range of 0.9982-0.9994 in Embodiments 1 to 3, the tensions and the heating temperature may be adjusted such that the first film will be made shorter beyond the range. In each of Embodiments 1 to 3, an excellent curling property was achieved. Specifically, an excellent curling property may be achieved by adjusting the change rate of "First/Second" to 99.88% or less (D≤0.9988).

Among the laminated films after elapse of 24 hours since the lamination, some of the first films and the second films became shorter than in the normal state, which resulted from shrinkage due to an influence of an ambient temperature after a heating process. If manufacturing is performed under a condition of a higher ambient temperature as, for example, in summer, the films may become longer than in the normal state.

Next, in Embodiments 4-7, manufacturing was performed using VMCPP for the second film and the same film for the first film as in Embodiments 1-3. The second film: VMCPP #25, 1020 mm width, 1000 m (produced by Mitsui Chemicals Tohcello, Inc., ML-CPWS 25 micron (μm)).

The heating temperature was set to 70° C. in Embodiments 4 and 5, and set to 80° C. in Embodiments 6 and 7. The nip pressure was set to 13250N in Embodiments 4 to 6, and to 23000N in Embodiment 7.

TABLE 2

|  | Film | | Tension [N] | | | | Length between Marks [mm] | | Change Rate | |
|---|---|---|---|---|---|---|---|---|---|---|
|  | First | Second | First Delivery Section | Coating Section | Heating Section | Second Delivery Section | First (Before) | First (After) | First [%] | Evaluation |
| Embodiment 4 | BOPP | PET | 180 | 180 | 180 | 80 | 499.5 | 499.5 | 100.00 | Good |
| Embodiment 5 |  |  | 180 | 180 | 180 | 10 | 499.5 | 499.8 | 100.08 | Good |
| Embodiment 6 |  |  | 180 | 180 | 180 | 10 | 499.5 | 500.2 | 100.14 | Good |
| Embodiment 7 |  |  | 180 | 180 | 180 | 10 | 499.5 | 500.2 | 100.14 | Good |

As shown in Table 2, curling property was obtained when the tension applied to the first film was larger than the tension applied to the second film.

Other Embodiments

Although the embodiments of the present invention have been described above, it is obvious that the present invention is not limited to the above-described embodiments but may be in various forms within the technical scope of the present invention.

For example, while the heating temperature was set to 70° C. or 80° C. in the above-described embodiments, the heating temperature may be set to a temperature within a range of 70° C.-80° C. or even higher than 80° C. Within a range of 70°

C.-100° C., particularly 80° C.-100° C., favorable extension of the films may be achieved without deterioration of the films. Alternatively, the heating temperature may be set to lower than 70° C. In this case, it is preferable to apply a higher tension to the first film.

Also, although a method for manufacturing a two-layer laminated film is exemplified in the above-described embodiments, a laminated film may be manufactured as a three or more layered film. In a case of manufacturing a three or more layered film, it may be possible to previously laminate an additional film to one of two films, or laminate an additional film after manufacturing the laminated film of the present invention. In addition, it may be possible to laminate a further film at the same time. The number of layers of a laminated film and steps for manufacturing the laminated film may be selected appropriately depending on needs.

Further, polyester resin such as PET may be used for the first film. Since PET is harder than polypropylene resin, it may be required to set a higher tension or set a higher heating temperature when pasting together the first film and the second film as compared with a case of using polypropylene resin for the first film, in order to provide the laminated film with a sufficient curling property. Alternatively, a thinner PET film may be employed. Specifically, using a PET film having about half a thickness of a polypropylene film may lead to a required curling property with almost the same tension and heating temperature in a case of using the polypropylene film for the first film. In a case of using a PET film in place of a polypropylene film with a thickness of 20-60 μm, the PET film preferably has about half the thickness, i.e., 12-25 μm.

What is claimed is:

1. A method for manufacturing a laminated film, comprising:
a lamination step of pasting together a first film and a second film in a state where the first film is stretched to be longer than a natural length thereof in a predetermined direction by applying tension to said first film, wherein said first film is configured to stretch when tension is applied thereto and to return to an initial length when no tension is applied thereto, said initial length substantially equal to the length of said first film prior to said application of tension.

2. The method for manufacturing a laminated film according to claim 1, wherein A1 is a length of a predetermined segment on the first film and A2 is a length of a predetermined segment on the second film in the predetermined direction before the lamination step, B1 is a length of the predetermined segment on the first film and B2 is a length of the predetermined segment on the second film after the lamination step, B1/A1 is a value C1, and B2/A2 is a value C2, a value D, obtained by dividing the value C1 by the value C2, is within a range of $D \leq 0.9994$.

3. The method for manufacturing a laminated film according to claim 1, wherein the first film comprises at least one of polypropylene resin and polyester resin, and the second film comprises at least one of polyester resin and polypropylene resin.

4. The method for manufacturing a laminated film according to claim 3, wherein the lamination step is a step of pasting together the first film and the second film in a state where the first film is heated to 80° C. or higher and stretched.

5. The method for manufacturing a laminated film according to claim 1, wherein the second film is extended less than the first film when tension is applied.

6. The method for manufacturing a laminated film according to claim 1, wherein the first film comprises polypropylene resin and the second film comprises polyethylene terephthalate resin.

* * * * *